United States Patent
Lin

(10) Patent No.: US 8,149,223 B2
(45) Date of Patent: Apr. 3, 2012

(54) TOUCH PANEL WITH STACKING ASSEMBLY

(76) Inventor: Teh-Zheng Lin, Taipei (TW)

( * ) Notice: Subject to any disclaimer, the term of this patent is extended or adjusted under 35 U.S.C. 154(b) by 549 days.

(21) Appl. No.: 12/367,551

(22) Filed: Feb. 9, 2009

(65) Prior Publication Data

US 2010/0201632 A1 Aug. 12, 2010

(51) Int. Cl.
*G06F 3/041* (2006.01)
(52) U.S. Cl. .......................... 345/173; 349/12
(58) Field of Classification Search .................. 345/156, 345/173–181
See application file for complete search history.

(56) References Cited

U.S. PATENT DOCUMENTS 6,847,355 B1 * 1/2005 Nishikawa et al. ........... 345/173
6,969,264 B2 * 11/2005 Fujii et al. ...................... 439/66

* cited by examiner

*Primary Examiner* — Duc Dinh

(57) ABSTRACT

A touch panel with a stacking assembly comprises: a glass substrate; an upper surface of the glass substrate being covered by a lower conductive film and a plurality of projective spacers arranged around the lower conductive film; a lower adhesive frame being arranged at an outer periphery of the upper surface of the glass substrate; a lower surface of the transparent film being formed with an upper conductive film and a plurality of metal conductive circuits connected to the upper conductive film; an outer periphery of the lower surface of the transparent film being installed with a lower adhesive frame; at an inner side of the lower adhesive frame being formed with adhesive textures; the upper adhesive frame being also formed with adhesive textures which are embedded into the recesses between the adhesive textures of the lower adhesive frame so that the transparent film is engaged with the glass substrate.

4 Claims, 3 Drawing Sheets

TOUCH PANEL WITH STACKING ASSEMBLY

FIELD OF THE INVENTION

The present invention relates to touch panels, and particularly to a touch panel with a stacking assembly having a firm structure and preferred sealing effect.

BACKGROUND OF THE INVENTION

Generally, a resistive touch panel is formed by two conductive films which are spaced with a predetermined distance. An upper conductive film is arranged to a flexible transparent film. A lower conductive film is arranged to a transparent substrate made of hard material. A plurality of spacers are formed therebetween so as to form spacing between the conductive films. Adhesive films are installed at each periphery of the films for combining the transparent film and the transparent substrate.

Generally, the adhesive frames are arranged at the periphery of at least one of the transparent film and transparent substrate. The adhesives are generally printed thereupon so that adhesive textures are formed within the area enclosed by the adhesive frame. In printing the adhesive is coated on the transparent film or the transparent substrate through a printed net. By the surface extension force of the adhesive, the adhesive textures will form with cambered surfaces which only provide small contact surfaces in combination of the transparent film and the substrate so that the effect of combination is not good. They cannot provide good sealing for the film and substrate.

Besides, in many touch panel, for an optimum working area and having a beautiful outlook, currently, the adhesive frame is made to edges of the film (or substrate) as much as possible and a width of the frame is made thinner and thinner. However this will affect the widths and number of the adhesive textures and reduce the adhesive area. The combining affect of the transparent film and transparent substrate will not be good.

SUMMARY OF THE INVENTION

Accordingly, the object of the present invention is to provide a combining assembly for stacking two touch panels. The wavelike adhesive textures are formed at the transparent film and glass substrate so that the transparent film and glass substrate are combined firmly.

To achieve above object, the present invention provides a touch panel with a stacking assembly, comprising: a glass substrate; an upper surface of the glass substrate being covered by a lower conductive film at a central portion thereof and a plurality of projective spacers arranged around the lower conductive film; a lower adhesive frame being arranged at an outer periphery of the upper surface of the glass substrate; a lower surface of the transparent film being formed with an upper conductive film and a plurality of metal conductive circuits which are connected to the upper conductive film; an outer periphery of the lower surface of the transparent film being installed with a lower adhesive frame; at an inner side of the lower adhesive frame being formed with three adhesive textures; the upper adhesive frame being also formed with adhesive textures which are embedded into and are adhesive to the recesses between the adhesive textures of the lower adhesive frame so that the transparent film is engaged with the glass substrate.

Further In, the present invention, a gap between two frames is slightly larger than a width of the adhesive texture.

Moreover, in the present invention, the adhesive texture is installed with extra adhesive outlet so that the extra adhesive can flow out from the outlet. The adhesive textures are made of material selected from insulating glue and conductive glue.

The touch panel with a stacking assembly further comprises an alignment unit. The alignment unit is symbols formed on the upper conductive film and lower conductive film. The alignment unit is formed on edges of the upper conductive film and lower conductive film.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
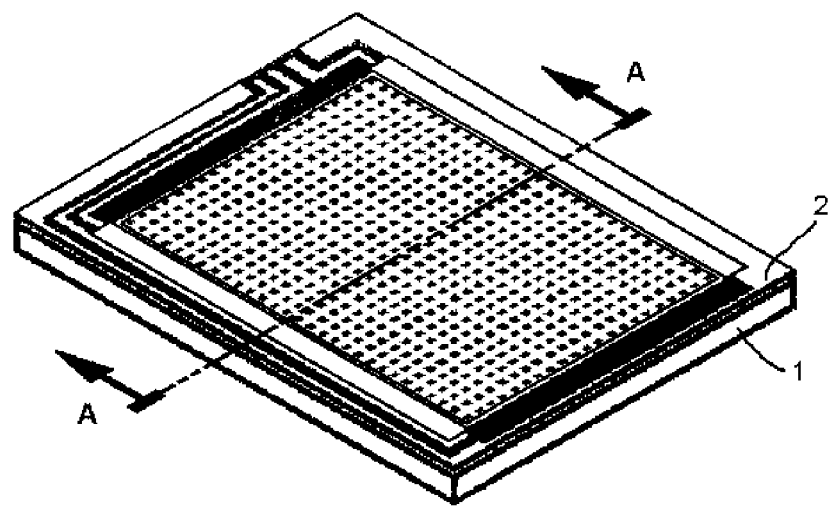
FIG. 1 is a perspective view of the present invention.
Figure 2:
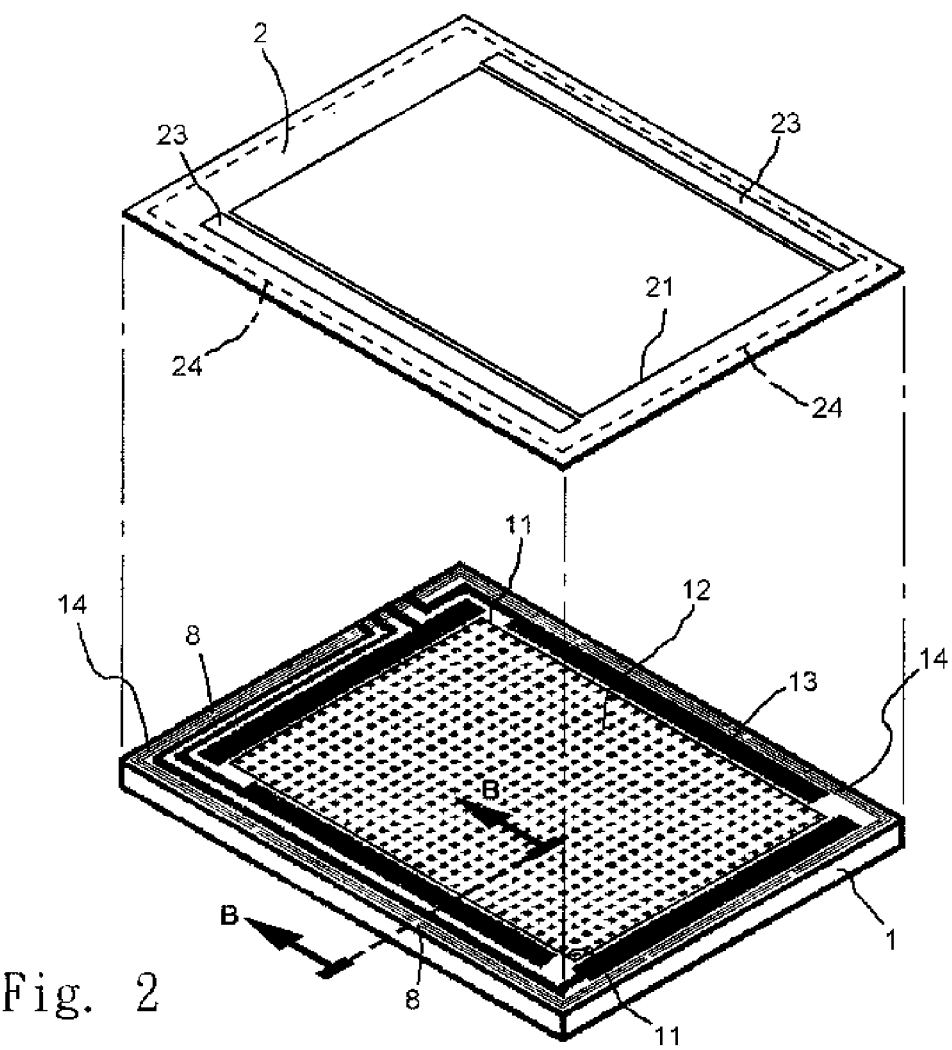
FIG. 2 is an exploded view of the present invention.
Figure 3:
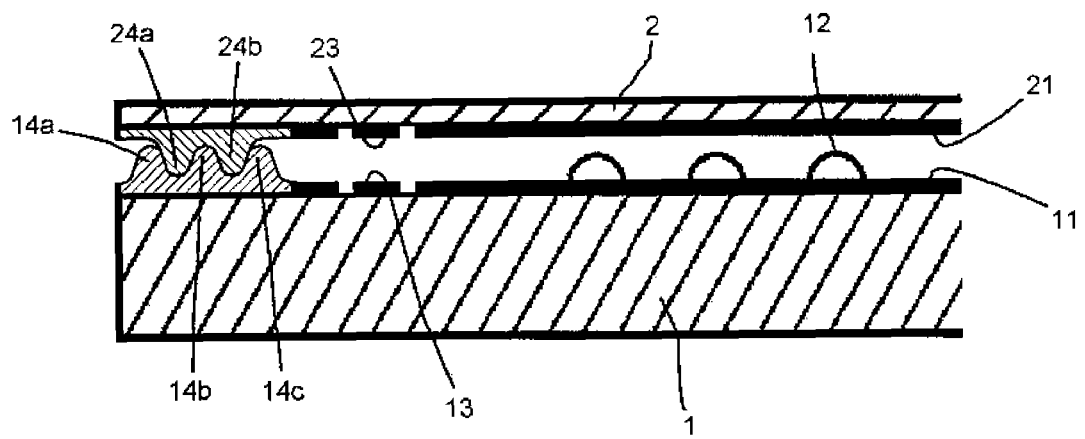
FIG. 3 is a cross sectional view along line A-A of FIG. 1.

With referring to FIGS. 1 to 3, the touch panel of the present invention includes a glass substrate 1.

An upper surface of the glass substrate 1 is covered by a lower conductive film 11 at a central portion thereof and a plurality of projective spacers 13 arranged around the lower conductive film 11. A lower adhesive frame 14 is arranged at an outer periphery of the upper surface of the glass substrate 1.

A lower surface of the transparent film 2 is formed with an upper conductive film 21 and a plurality of metal conductive circuits 23 which are connected to the upper conductive film 21. An outer periphery of the lower surface of the transparent film 2 is installed with a lower adhesive frame 14. At an inner side of the lower adhesive frame 14 is formed with three adhesive textures 14a, 14b, and 14c. The upper adhesive frame 24 is formed with two adhesive textures 24a, 24b which are embedded into and are adhesive to the two recesses between the adhesive textures 14a, 14b, 14c of the lower adhesive frame 14 so that the transparent film 2 is engaged with the glass substrate 1.

Figure 4:
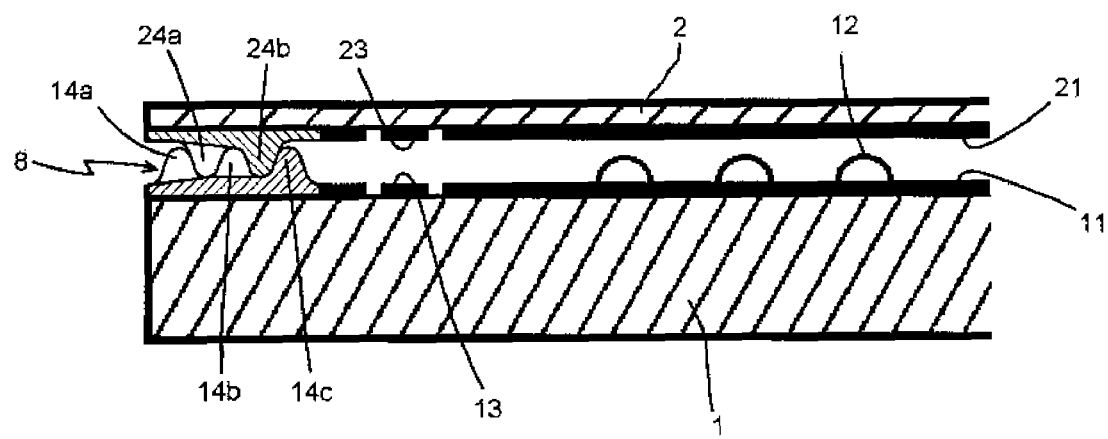
FIG. 4 is a cross sectional view along line B-B of FIG. 1.

With referring to FIGS. 2 to 4, it is illustrated that the adhesive textures 14a, 14b, and 24a are installed with extra adhesive outlet 8 so that the extra adhesive can flow out from the outlet. Thus the connection area is flat with a beautiful outlook. The adhesive will not flow to the conductive film to interfere the signals.

Figure 5:
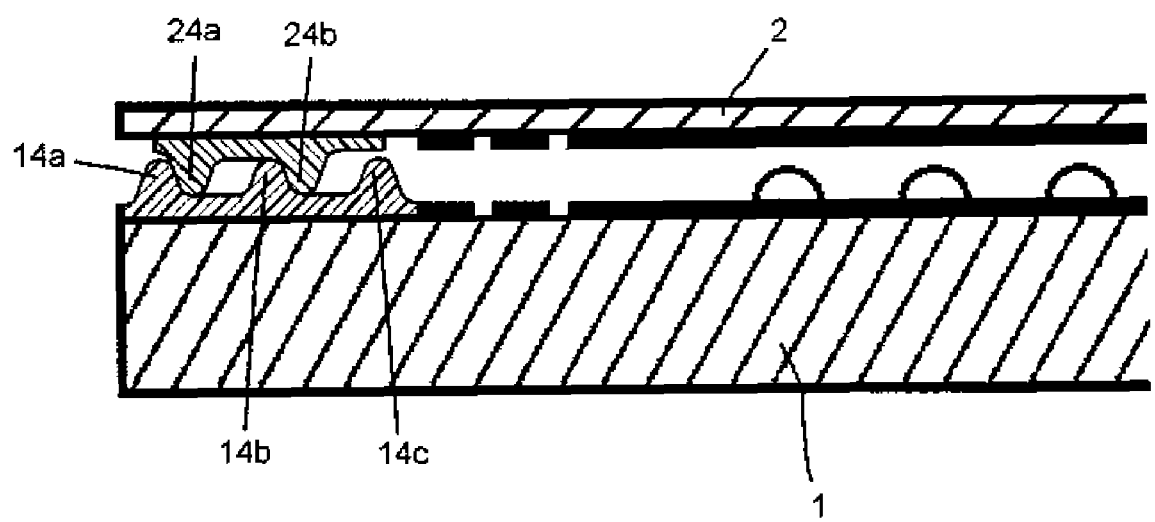
FIG. 5 is a cross sectional view of another embodiment of the present invention.

With referring to FIG. 5, another embodiment of the present invention is illustrated. When a width of the recess is greater than that of each adhesive textures, only one side of the adhesive textures 14a, 14b, 14c is adhesive to one side of the adhesive textures.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A touch panel with a stacking assembly, comprising: a glass substrate at a lowermost side and a transparent film at an uppermost side; an upper surface of the glass substrate being covered by a lower conductive film at a central portion thereof and a plurality of projective spacers arranged around the lower conductive film; a lower adhesive frame being arranged at an outer periphery of the upper surface of the glass substrate; a lower surface of the transparent film being formed with an upper conductive film and a plurality of metal conductive circuits which are connected to the upper conductive film; an outer periphery of the lower surface of the transparent film being installed with a lower adhesive frame; at an inner side of the lower adhesive frame being formed with adhesive textures; the upper adhesive frame being also formed with adhesive textures which are embedded into and are adhesive to the recesses between the adhesive textures of the lower adhesive frame so that the transparent film is engaged with the glass substrate.

2. The touch panel with a stacking assembly as claimed in claim 1, wherein a gap between the two frames is slightly larger than a width of the adhesive texture.

3. The touch panel with a stacking assembly as claimed in claim 1, wherein the adhesive texture is installed with extra adhesive outlet so that the extra adhesive can flow out from the outlet.

4. The touch panel with a stacking assembly us claimed in claim 1, wherein the adhesive textures are made of material selected from insulating glue and conductive glue.

* * * * *